Aug. 16, 1932.  F. WALLIN  1,872,534
HANDLE ATTACHING MEANS FOR BROOMS AND THE LIKE
Filed March 5, 1930
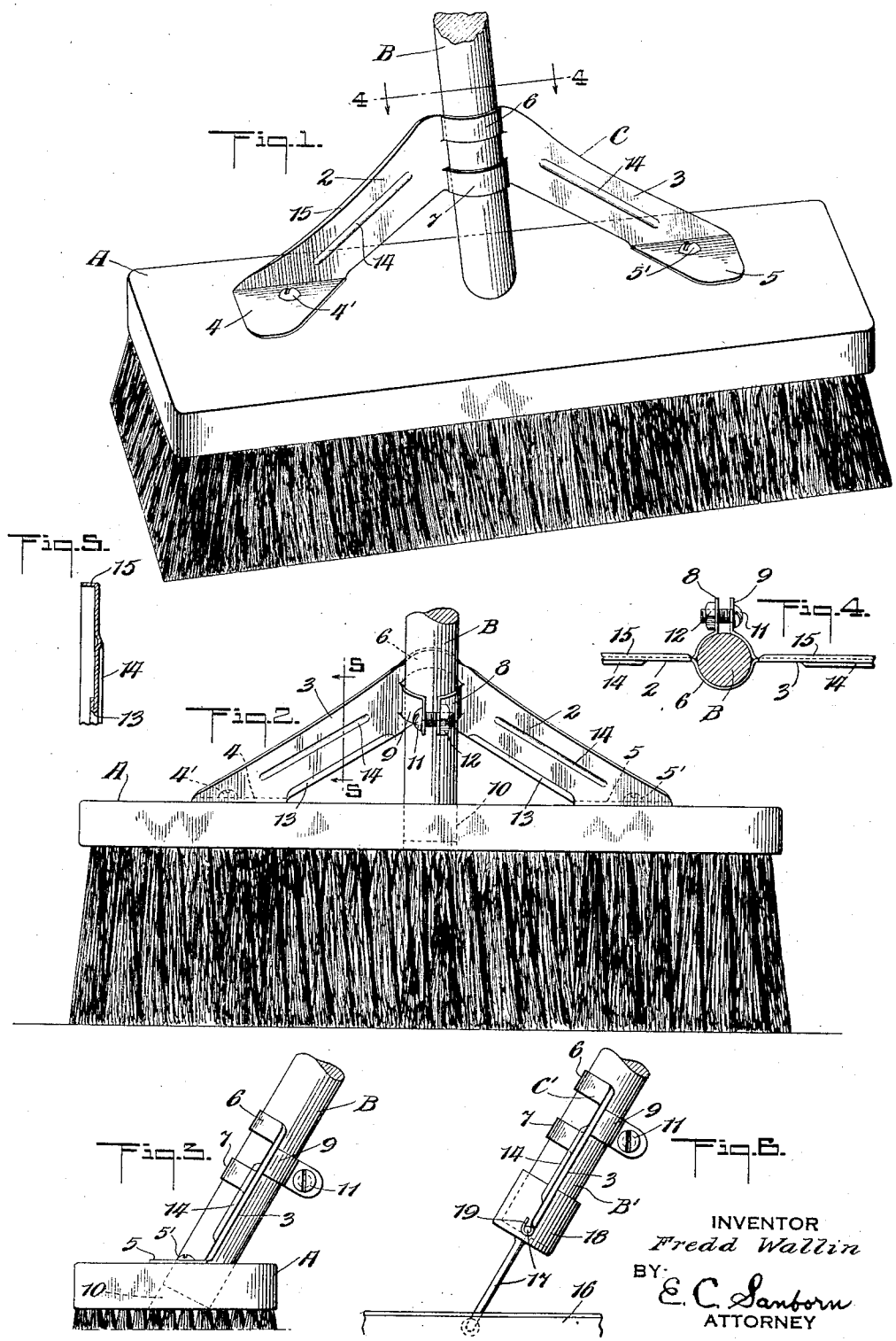
INVENTOR
Fredd Wallin
BY
E. C. Sanborn
ATTORNEY Patented Aug. 16, 1932

1,872,534

UNITED STATES PATENT OFFICE

FREDD WALLIN, OF NEW YORK, N. Y.

HANDLE ATTACHING MEANS FOR BROOMS AND THE LIKE

Application filed March 5, 1930. Serial No. 433,216.

This invention is concerned with the provision of improved means whereby handles may be effectively secured to sweeping implements such as push-brooms or brushes and the like. The invention has also for its object the provision of an efficient handle securing means which acts as a rigid brace for the handle. My invention further provides a handle attaching means which enables the handle to be readily removed and replaced without removing the attaching means from the broom head. An additional object of the invention is the provision of a handle securing means having the above noted advantages and which at the same time shall be simple and inexpensive to manufacture. My invention further provides for the secure attachment of handles to broom heads and the like without the necessity of threading said handles to such heads. Other features of the invention will be hereinafter described and claimed.

In the accompanying drawing:

Fig. 1 is a perspective view showing an embodiment of my invention applied to the head of a push broom;

Fig. 2 is a rear elevation of the structure shown in Fig. 1;

Fig. 3 is a side elevation of said construction;

Fig. 4 is a horizontal sectional view taken on line 4—4 of Fig. 1;

Fig. 5 is a vertical sectional view taken on line 5—5 of Fig. 2, and

Fig. 6 is a view in side elevation showing an embodiment of my invention applied to a carpet sweeper.

Referring to the drawing there is shown at A the brush-like head of a push broom, the lower portion of the handle for which is shown at B. My improved handle securing and bracing means is designated generally as C, and is shown as comprising laterally and downwardly extending portions or arms 2, 3, having feet 4, 5, respectively, projecting forwardly from the lower ends of said arms. Through said feet the member C may be secured to the broom head as by screws 4', 5'. The arms 2, 3, are joined at their upper ends by a handle receiving portion. The latter is shown as comprising semi-annular members 6, 7, extending from the forward face of one of said arms 2, 3, to that of the other, and a pair of clamping fingers 8, 9, projecting from the rear of said arms 2, 3, respectively. The brush-head A is shown provided with a hole 10 into which the lower end of the handle is fitted, the handle passing as shown through the handle receiving portion of the attaching and bracing member C. After the handle has been fitted into the hole 10 the fingers 8, 9, are drawn toward each other and caused to grip the handle tightly. This may be accomplished in any suitable way as by means of a screw or bolt 11 passing through said fingers and provided with a nut 12.

It will be seen that with the foregoing construction the handle, after insertion into the hole 10, may be securely clamped between the members 6, 7, and the fingers 8, 9, so that said handle is firmly fastened to the head A. At the same time the arms 2, 3, effectively brace said handle. Heretofore, it has been customary to provide the lower ends of push-broom-handles with screw threads and to provide internally threaded holes in the broom heads for cooperating with the threaded handles; such arrangements presenting the danger that the handle may become unscrewed from the head. By my clamping attachment the provision of such threads is rendered unnecessary and the disadvantages of the prior arrangements are obviated; the handle being held fixedly to the head in my arrangement with the utmost security, and without the likelihood of loosening or falling out. My clamping attachment may, of course, if desired, be employed with handles having threaded ends and, when so employed, effectively prevents unscrewing of said handles.

In case it should be desired to release the handle for removal from my clamping means, such may be readily accomplished by simply turning the screw 11 in such direction as to relax the grip of the fingers 8, 9. It will be noted that removal and reinsertion or replacement of handles in my clamping attachment may be effected without removing the clamping attachment from the brush-head.

Under service conditions there is a tendency for broom handles to break just above the head. This tendency is overcome by the attaching and bracing means which I have devised. Should the handle for any reason be broken above the bracing means, the broken lower portion may be removed from the hole 10, the lower end of the main portion shaped to fit said hole, said main portion inserted into the clamping attachment with its lower end in the hole aforesaid, and the screw 11 turned to again clamp said handle securely in place. It will be seen that inasmuch as the provision of screw threads in the hole and on the handle are rendered unnecessary by my invention, the operation of removing a broken handle end from the hole is greatly expedited and that the fitting into said hole of the lower end of the main portion of the handle may be accomplished with facility.

The clamping attachment C may be conveniently formed as a stamping from a single piece of sheet metal. The edges of the brace arms 2, 3 may be turned over as indicated at 13, so as to reinforce said arms. Additional reinforcement may be provided by stamping out or otherwise providing longitudinal ribs 14 in said arms. To facilitate manipulation of the broom for cleaning around corners or obstructions, the top surface of the arms 2, 3, are preferably slightly curved as indicated at 15. Also, the top edges of the arms 2, 3, are preferably turned over, as shown, whereby cutting of any object is prevented as the broom is drawn back. It may be further noted that the attachment C may conveniently be employed as a hanger, since the broom may readily be supported from a nail or bracket through either of the arms 2, 3.

The clamping attachment may, of course, be secured to various types of brooms, brushes, or other sweeping implements. In Fig. 6, I have illustrated said attachment as applied to a carpet sweeper 16 having the usual bail 17, and socket 18, for the reception of a handle B'. The attachment C' is the same as that hereinbefore described except that the feet at the lower ends of the brace arms thereof are turned over, as indicated at 19 for engagement with the bail 17.

The terms and expressions which I have employed are used as terms of description and not of limitation, and I have no intention, in the use of such terms and expressions, of excluding any mechanical equivalents of the features shown and described or portions thereof, but recognize that various structural modifications are possible within the scope of the invention claimed.

I claim:

An element providing for the attachment of handles to sweeping implements, said element being formed of a single sheet of metal and comprising diverging brace arms, members spaced from each other and extending between said arms and shaped to conform to a portion of the periphery of a handle, a finger struck out from said sheet in a zone intermediate said members, said finger extending from one of said arms and being shaped to engage a portion of the periphery of said handle, and means cooperating with said finger for causing the latter to clamp the handle to said arms.

In testimony whereof, I have signed my name to this specification this 28th day of February, 1930.

FREDD WALLIN.